US009587091B2

(12) United States Patent
Enomoto et al.

(10) Patent No.: US 9,587,091 B2
(45) Date of Patent: Mar. 7, 2017

(54) GLOVE HAVING EXCELLENT CHEMICAL RESISTANCE AND COMPOSITION FOR SAID GLOVE

(71) Applicant: KOSSAN SDN BHD, Klang (MY)

(72) Inventors: Norihide Enomoto, Tokyo (JP); Taichi Ogawa, Tokyo (JP); Lawrence Siau Tian Lim, Klang (MY); Seek Ping Lee, Klang (MY); Eng Long Ong, Klang (MY)

(73) Assignee: KOSSAN SDN BHD, Klang (MY)

( * ) Notice: Subject to any disclaimer, the term of this patent is extended or adjusted under 35 U.S.C. 154(b) by 22 days.

(21) Appl. No.: 14/424,741

(22) PCT Filed: Aug. 30, 2013

(86) PCT No.: PCT/JP2013/073411
§ 371 (c)(1),
(2) Date: Feb. 27, 2015

(87) PCT Pub. No.: WO2014/034889
PCT Pub. Date: Mar. 6, 2014

(65) Prior Publication Data
US 2015/0218352 A1    Aug. 6, 2015

(30) Foreign Application Priority Data

Aug. 31, 2012 (JP) ................ 2012-191264

(51) Int. Cl.
| | | |
|---|---|---|
| A41D 19/00 | (2006.01) |
| C08F 236/06 | (2006.01) |
| C08K 3/22 | (2006.01) |
| C08K 5/00 | (2006.01) |
| C08L 13/00 | (2006.01) |
| C08F 236/12 | (2006.01) |

(52) U.S. Cl.
CPC .......... *C08L 13/00* (2013.01); *A41D 19/0055* (2013.01); *C08F 236/06* (2013.01); *C08F 236/12* (2013.01); *C08K 5/0025* (2013.01); *C08L 2203/02* (2013.01); *C08L 2205/025* (2013.01)

(58) Field of Classification Search
None
See application file for complete search history.

(56) References Cited

U.S. PATENT DOCUMENTS

| | | | |
|---|---|---|---|
| 9,267,021 B2 * | 2/2016 | Khoo | ........................ C08L 9/00 |
| 9,326,557 B2 * | 5/2016 | Khoo | ................. A41D 19/0055 |
| 2013/0191964 A1 | 8/2013 | Khoo et al. | |
| 2013/0198933 A1 | 8/2013 | Khoo et al. | |

FOREIGN PATENT DOCUMENTS

| | | |
|---|---|---|
| CN | 101020732 | 8/2007 |
| CN | 101747542 | 6/2010 |
| JP | 2000-26547 | 1/2000 |
| JP | 2005139300 A | 6/2005 |
| JP | 2006524735 A | 11/2006 |
| JP | 2007-177091 | 7/2007 |
| JP | 2009-203272 | 9/2009 |
| JP | 2010-144163 | 7/2010 |
| JP | 2011-132355 | 7/2011 |
| WO | 2011/068394 | 6/2011 |
| WO | 2012/043893 | 4/2012 |
| WO | 2012/043894 | 4/2012 |

OTHER PUBLICATIONS

Extended European Search Report, Mar. 2, 2016; European Patent Application 13833395.0 (6 pages).
Official Action issued Mar. 16, 2016 in Japanese Patent Application 2014-533130 (12 pages).
Chinese Office Action, Jun. 1, 2016, Chinese Patent Application 2013800454101 with English translation (15 pages).

\* cited by examiner

*Primary Examiner* — Irina S Zemel
*Assistant Examiner* — Jeffrey Lenihan
(74) *Attorney, Agent, or Firm* — Hamre, Schumann, Mueller & Larson, P.C.

(57) ABSTRACT

An emulsion composition for producing a glove, the composition containing: (1) a carboxylated acrylonitrile-butadiene elastomer, comprising 30 to 40% by weight of acrylonitrile residues and 3 to 8% by weight of unsaturated carboxylic acid residues, having an elemental sulfur content detected by neutralization titration of a combusted product of the elastomer of not more than 1% by weight of the elastomer weight, and having a Mooney viscosity ($ML_{(1+4)}$ (100° C.)) of 100 to 220, and (2) a poly(acrylonitrile-butadiene) having a styrene-equivalent weight-average molecular weight of 7,000 to 500,000, wherein the weight ratio of component (1)/component (2) is from 70/30 to 90/10. Also provided is a glove which, as a result of comprising the emulsion composition, exhibits excellent chemical resistance and superior flexibility.

9 Claims, No Drawings

GLOVE HAVING EXCELLENT CHEMICAL RESISTANCE AND COMPOSITION FOR SAID GLOVE

TECHNICAL FIELD

The present invention relates to a glove and a composition for that glove. More specifically, the present invention relates to a glove which, as a result of being formed from a specific elastomer combination, provides improved chemical resistance while maintaining good flexibility, and a composition for producing the glove.

BACKGROUND ART

Rubber gloves are widely used in a variety of industrial fields and medical fields and the like, including the electronic component manufacturing industry and the pharmaceutical industry. Conventionally, gloves obtained by dip molding of a latex composition prepared by crosslinking a carboxylated acrylonitrile-butadiene copolymer with sulfur and a sulfur-based vulcanization accelerator such as a thiazole have been widely used as rubber gloves that exhibit excellent tensile strength and oil resistance and the like. However, sulfur and sulfur-based vulcanization accelerators suffer from various problems, and in particular, can cause type IV allergies.

Accordingly, various gloves which employ non-sulfur-based crosslinking have been proposed. For example, Patent Document 1 discloses a glove which uses an acid-modified nitrile rubber having a high methyl ethyl ketone-insoluble fraction. Further, Patent Document 2 discloses a glove which uses a carboxylic acid-modified nitrile copolymer comprising, as a structural unit, a monomer containing a crosslinkable functional group such as a glycidyl group. Furthermore, Patent Document 3 discloses a glove which uses a self-crosslinking carboxylated acrylonitrile-butadiene.

CITATION LIST

Patent Literature

Patent Document 1: JP 2007-177091 A
Patent Document 2: JP 2010-144163 A
Patent Document 3: WO 2011/068394

SUMMARY OF THE INVENTION

Technical Problem

However, in order to increase the size of the methyl ethyl ketone-insoluble fraction, a special polymerization method must be used, which includes increasing the polymerization temperature to 55 to 95° C., but this method is not practical. Although this type of problem does not arise for gloves which use either the carboxylic acid-modified nitrile copolymer that utilizes glycidyl group modification, or the self-crosslinking latex, investigations by the inventors of the present invention reveal that these types of gloves do not have satisfactory chemical resistance to compounds such as hydrofluoric acid that are widely used in cleanrooms.

The present invention has an object of providing a glove which exhibits excellent chemical resistance and flexibility, and a composition for producing the glove.

Solution to the Problem

The present invention provides a carboxylated acrylonitrile-butadiene elastomer, comprising 30 to 40% by weight of acrylonitrile residues and 3 to 8% by weight of unsaturated carboxylic acid residues, having an elemental sulfur content detected by neutralization titration of a combusted product of the elastomer of not more than 1% by weight of the elastomer weight, and having a Mooney viscosity ($ML_{(1+4)}$ (100° C.)) of 100 to 220.

Further, the present invention also provides an emulsion composition comprising:

(1) a carboxylated acrylonitrile-butadiene elastomer, comprising 30 to 40% by weight of acrylonitrile residues and 3 to 8% by weight of unsaturated carboxylic acid residues, having an elemental sulfur content detected by neutralization titration of a combusted product of the elastomer of not more than 1% by weight of the elastomer weight, and having a Mooney viscosity ($ML_{(1+4)}$ (100° C.)) of 100 to 220, and (2) a poly(acrylonitrile-butadiene) having a styrene-equivalent weight-average molecular weight of 7,000 to 500,000, wherein the weight ratio of component (1)/component (2) is from 70/30 to 90/10.

Moreover, the present invention also provides a glove obtained from the above composition.

Advantageous Effects of the Invention

The carboxylated acrylonitrile-butadiene elastomer of the present invention has non-sulfur crosslinked structures, and offers excellent chemical resistance without causing problems such as allergies. By forming a glove using a combination of the elastomer and a poly(acrylonitrile-butadiene) having a prescribed molecular weight, a glove having excellent chemical resistance and superior flexibility can be produced. Although not intended to limit the scope of the invention, it is thought that incorporating the prescribed amount of acrylonitrile provides excellent chemical resistance, whereas combining the carboxylated acrylonitrile-butadiene elastomer of comparatively low flexibility with a poly(acrylonitrile-butadiene) that exhibits good compatibility with the elastomer supplements the flexibility. Further, because the polyacrylonitrile-butadiene) has a prescribed molecular weight, the problem of the poly(acrylonitrile-butadiene) migrating to the surface of the glove does not occur.

DESCRIPTION OF EMBODIMENTS

<Carboxylated Acrylonitrile-Butadiene Elastomer>

In the present invention, the term "carboxylated acrylonitrile-butadiene elastomer" (hereafter abbreviated as "XNBR") is a broad term which includes all carboxyl group-containing elastomers obtained by copolymerizing the acrylonitrile and butadiene which constitute the main chain of the rubber, at least one unsaturated carboxylic acid, and other copolymerizable monomers as desired. Further, a portion of the carboxyl groups may be derivatized (for example, esters or amides) to form crosslinked structures.

The XNBR comprises 30 to 40% by weight, and preferably 32 to 38% by weight, of acrylonitrile residues. If the amount of acrylonitrile residues is less than 30% by weight, then the chemical resistance of the obtained XNBR tends to be unsatisfactory. On the other hand, if the amount of acrylonitrile residues exceeds 40% by weight, then the flexibility of the obtained XNBR tends to be unsatisfactory. The amount of acrylonitrile residues within the XNBR can be ascertained by determining the amount of nitrile groups by calculation from the amount of nitrogen atoms determined by elemental analysis.

The XNBR comprises 4 to 8% by weight, and preferably 4 to 6% by weight, of unsaturated carboxylic acid residues. If the amount of unsaturated carboxylic acid residues is less than 4% by weight, then crosslinking formation by the divalent ions described below is unsatisfactory, and sufficient crosslinked structures are not formed within the XNBR. On the other hand, if the amount exceeds 8% by weight, then the number of crosslinked structures becomes excessive, which tends to cause a deterioration in the physical properties such as the tensile strength and tensile stress (modulus) of the rubber gloves that represent the final product. Acrylic acid and/or methacrylic acid (hereafter referred to as "(meth)acrylic acid") are used as the unsaturated carboxylic acid, and the use of methacrylic acid is preferable. The amount of unsaturated carboxylic acid residues within the XNBR can be determined by quantifying the amount of carboxyl groups and carboxyl group-derived carbonyl groups by infrared (IR) spectroscopy or the like.

The other structural elements of the XNBR are butadiene residues and crosslinking structures. The butadiene that constitutes the butadiene residues is preferably 1,3-butadiene. Further, the amount of the butadiene residues is typically from 52 to 66% by weight, and preferably from 56 to 64% by weight, relative to the combined weight of the butadiene residues, the aforementioned acrylonitrile residues and the aforementioned unsaturated carboxylic acid residues. When the amount of the butadiene residues satisfies this range, a final product having excellent physical properties such as tensile characteristics and fatigue characteristics can be obtained.

In the present invention, the crosslinked structures of the XNBR are non-sulfur crosslinked structures. Because the crosslinked structures are non-sulfur crosslinked structures, the elemental sulfur content detected by neutralization titration of an XNBR combustion gas absorbent can be suppressed to not more than 1.0% by weight of the XNBR weight. This quantitative method is a method in which the combustion gas generated by combusting a 0.01 g sample of the XNBR in air at 1,350° C. for 10 to 12 minutes is absorbed in $H_2O_2$ water containing an added mixed indicator, and a neutralization titration is then performed using a 0.01 N aqueous solution of NaOH.

There are no particular limitations on the non-sulfur crosslinked structures in the present invention, and examples include main-chain crosslinking by an organic peroxide or oxime or the like, crosslinking between carboxyl groups by an acid anhydride or the like, crosslinking between carboxyl groups using a crosslinking agent such as a polyepoxide, polyol, polyimide, mono- or poly-carbodiimide, or polyisocyanate or the like, and crosslinking achieved by introducing a structural unit having a group such as a glycidyl group that exhibits reactivity with carboxyl groups into the main chain, and then reacting the group with a carboxyl group. Self-crosslinking is preferable, namely a compound which is stable under normal storage conditions, but then forms crosslinked structures when, for example, water is evaporated or heat is applied, or when the pH is altered, even without the addition of a separated crosslinking agent. Examples of this type of crosslinking include crosslinking caused by autoxidation of carboxyl groups, crosslinking achieved by introducing n-methylolacrylamide units and then subjecting these units to self-condensation, and crosslinking produced by a Michael reaction between an acetoacetoxy group and an unsaturated bond.

The XNBR can be prepared by subjecting acrylonitrile, (meth)acrylic acid, 1,3-butadiene, and any other optional unsaturated monomers used for forming crosslinking structures or the like to an emulsion polymerization in accordance with conventional methods. During the emulsion polymerization, typically used emulsifiers, polymerization initiators and molecular weight regulators and the like may be used.

Examples of the other unsaturated monomers include aromatic vinyl monomers such as styrene, α-methylstyrene and dimethylstyrene; ethylenic unsaturated carboxylic acid amide monomers such as (meth)acrylamide, N,N-dimethylacrylamide and N-methylolacrylamide; ethylenic unsaturated carboxylic acid alkyl ester monomers such as methyl (meth)acrylate, ethyl (meth)acrylate, butyl (meth)acrylate and 2-ethylhexyl (meth)acrylate; and vinyl acetate.

Examples of the emulsifiers include anionic surfactants such as dodecylbenzene sulfonates and aliphatic sulfonates; cationic surfactants such as polyethylene glycol alkyl ethers and polyethylene glycol alkyl esters; and amphoteric surfactants. Among these, the use of an anionic surfactant is preferable.

There are no particular limitations on the polymerization initiator provided it is a radical initiator, and examples include inorganic peroxides such as ammonium persulfate and potassium perphosphate; organic peroxides such as t-butyl peroxide, cumene hydroperoxide, p-menthane hydroperoxide, di-t-butyl peroxide, t-butylcumyl peroxide, dibenzoyl peroxide, 3,5,5-trimethylhexanoyl peroxide and t-butylperoxy isobutyrate; and azo compounds such as azobisisobutyronitrile, azobis-2,4-dimethylvaleronitrile, azobis (cyclohexanecarbonitrile) and methyl azobisisobutyrate.

Examples of the molecular weight regulators include mercaptans such as t-dodecyl mercaptan and n-dodecyl mercaptan; and halogenated hydrocarbons such as carbon tetrachloride, methylene chloride and methylene bromide. Among these, the use of a mercaptan is preferable. Moreover, if necessary, dispersants and pH regulators and the like may also be used.

Subsequently, the polymer obtained by performing the emulsion polymerization is subjected to heating or the evaporation of water or the like, thus effecting a non-sulfur crosslinking step and obtaining the XNBR. This step may be performed simultaneously with the divalent ion crosslinking described below, or may be performed as a heating step following the ion crosslinking.

The obtained XNBR has a molecular weight that yields a Mooney viscosity ($ML_{(1+4)}$ (100° C.)) of 100 to 220, and preferably 100 to 190. If the Mooney viscosity is less than 100, then obtaining sufficient strength for the XNBR becomes difficult. On the other hand, the upper limit mentioned above is the practical measurement limit for the Mooney viscosity, and compounds having a viscosity that exceeds this limit have a high viscosity and are difficult to mold.

Further, the XNBR has a toluene weight swelling ratio of 190 to 400% by weight, and preferably 200 to 400% by weight. If this swelling ratio is less than 190% by weight, then the degree of crosslinking is low, and the strength upon producing a glove is insufficient, whereas if the swelling ratio exceeds 400% by weight, then the flexibility of the gloves is inadequate.

<Emulsion Composition>

An emulsion composition of the present invention is an emulsion-like composition which comprises a poly(acrylonitrile-butadiene) (hereafter abbreviated as "NBR") in addition to the aforementioned XNBR. The styrene-equivalent weight-average molecular weight of the NBR is within a range from 7,000 to 50,000, and preferably from 9,000 to 30,000. If the molecular weight is less than 7,000, then bleeding, in which the NBR migrates to the surface of the gloves, becomes a concern, whereas if the molecular weight exceeds 50,000, then the flexibility of the gloves may sometimes be inadequate.

The NBR comprises 20 to 50% by weight, and preferably 30 to 40% by weight, of acrylonitrile residues, with the remainder being butadiene residues. If the amount of acrylonitrile residues is less than 20% by weight, then the chemical resistance of the gloves deteriorates, whereas if the amount exceeds 50% by weight, then the molecular chain tends to become rigid, causing a loss in flexibility of the gloves.

The mixing ratio between the XNBR (hereafter referred to as "component (1)") and the NBR (hereafter referred to as "component (2)") in the emulsion composition of the present invention is set so that the weight ratio of component (1)/component (2) is within a range from 70/30 to 90/10, and preferably from 70/30 to 85/15. If this weight ratio is less than 70/30, then the chemical resistance of the gloves becomes inadequate, whereas if the weight ratio exceeds 90/10, then achieving satisfactory flexibility for the gloves is difficult. As described in detail below in the examples, this weight ratio can be determined by extracting the component (2) by a methyl ethyl ketone extraction performed under reflux.

The emulsion composition also comprises a divalent metal oxide and a dispersant in addition to the component (1) and the component (2). The divalent metal oxide mainly performs ion crosslinking between carboxyl groups in the component (1). Examples of the divalent metal oxide include oxides of zinc, calcium, and magnesium and the like, and among these, the use of zinc oxide is preferable. The amount used of the divalent metal oxide is typically from 0.5 to 4.0 parts by weight, and preferably from 0.7 to 3.0 parts by weight, relative to an amount of 100 parts by weight of the resin fraction, namely the combination of the component (1) and the component (2).

The dispersant is preferably an anionic surfactant, and examples include carboxylates (salts of carboxylic acids), sulfonates (salts of sulfonic acids), phosphates (salts of phosphoric acids), polyphosphate esters, high-molecular weight alkyl aryl sulfonates, high-molecular weight sulfonated naphthalenes, and high-molecular weight naphthalene/formaldehyde condensation polymers. Sulfonates can be used particularly favorably. The amount of the dispersant is typically from 0.5 to 4 parts by weight, and preferably from 1 to 3 parts by weight, relative to 100 parts by weight of the combination of the component (1) and the component (2).

The emulsion composition may also include common additives in addition to the components described above. Examples of these additives include pH regulators, pigments, antioxidants, chain transfer agents, and polymerization initiators. Potassium hydroxide is usually used as the pH regulator. The amount used of potassium hydroxide is typically from 0.1 to 2.0 parts by weight per 100 parts by weight of the emulsion composition. Titanium dioxide, for example, can be used as the pigment. A hindered phenol type antioxidant can be used as the antioxidant. Mercaptans typified by t-dodecyl mercaptan or the like can be used as the chain transfer agent. There are no particular limitations on the polymerization initiator, and examples of compounds which may be used include inorganic peroxides such as sodium persulfate, organic peroxides such as benzoyl peroxide, and chelating agents such as sodium ethylenediaminetetraacetate.

The emulsion composition of the present invention can be produced by mixing the component (1), the component (2), the divalent metal oxide, the dispersant, the various additives and water in a conventional mixing device such as a mixer. The emulsion composition of the present invention has a solid fraction of 30 to 60% by weight, and preferably 40 to 50% by weight, relative to the total weight of the emulsion composition.

Gloves of the present invention can be produced using the above emulsion composition, using the conventional dipping method described below.

1) A dipping mold (hereafter referred to as a "former") is dipped in a coagulant solution to adhere the coagulant to the former. Any inorganic salt having an elastomer-precipitating effect may be used as the coagulant, and for example, a 5 to 20% by weight aqueous solution of calcium chloride or magnesium chloride may be used.

2) Following drying of the former with the adhered coagulant at 50 to 70° C., the former is dipped in the emulsion composition of the present invention for a time appropriate for the targeted thickness of the gloves, typically a time of about 1 to 20 seconds.

3) The former that has been coated with the emulsion composition is heated at 80 to 120° C. for 20 to 70 seconds, and is then washed with water.

4) Following the water washing, beading (a sleeve winding step) is performed, and the gloves are then subjected to a post-heating step at 120 to 150° C.

The gloves obtained in the manner described above exhibit excellent flexibility while having good resistance to chemicals such as hydrofluoric acid.

EXAMPLES

The present invention is described below in further detail using a series of examples, but the present invention is in no way limited by these examples.

[Preparation of Elastomers]
1) Preparation of XNBR
The five varieties of XNBR shown in Table 1 were prepared using the procedure described below.

A pressure-resistant polymerization reactor fitted with a stirrer was charged with an emulsion composed of 120 parts by weight of ion-exchanged water, 35 parts by weight of acrylonitrile, 59 parts by weight of 1,3-butadiene, 6 parts by weight of methacrylic acid, 0.3 parts by weight of N-methylolacrylamide, 3 parts by weight of sodium dodecylbenzene sulfonate, 0.3 parts by weight of potassium persulfate and 0.05 parts by weight of sodium ethylenediaminetetraacetate, and following reaction for 18 hours with the temperature held at 40° C., a reaction terminator was added to halt the polymerization, thus obtaining a copolymer latex. Following the removal of unreacted monomers from the obtained copolymer latex, ammonia water (pH: 13.3) was added dropwise to adjust the pH of the copolymer latex to a value of 8 or higher, and the concentration was then adjusted to obtain XNBR-A having a solid fraction concentration of 45%.

With the exceptions of altering the amount of acrylonitrile to 34 parts by weight, altering the amount of N-methylolacrylamide to 0.4 parts by weight, and setting the reaction temperature to 30° C., XNBR-B was prepared under the same conditions as XNBR-A. With the exceptions of altering the amount of acrylonitrile to 25 parts by weight, setting the amount of N-methylolacrylamide to 0.3 parts by weight, and setting the reaction temperature to 40° C. and the reaction time to 18 hours, XNBR-C was prepared under the same conditions as XNBR-A. With the exceptions of altering the amount of acrylonitrile to 34 parts by weight, altering the amount of N-methylolacrylamide to 0.5 parts by weight, and setting the reaction temperature to 40° C. and the reaction time to 24 hours, XNBR-D was prepared under the same conditions as XNBR-A. With the exceptions of altering the amount of acrylonitrile to 34 parts by weight, not using N-methylolacrylamide, and setting the reaction temperature to 50° C. and the reaction time to 16 hours, XNBR-E was prepared under the same conditions as XNBR-A.

The properties of each obtained XNBR were measured using the methods described below. The results are shown in Table 1.

<Unsaturated Carboxylic Acid Residues>

The emulsion of each XNBR was dried to form a film. The film was measured by FT-IR, the ratio between the absorbance (Abs) at 1699 $cm^{-1}$ and 2237 $cm^{-1}$ was determined, and the amount of unsaturated carboxylic acid residues was calculated form the following formula.

Amount of unsaturated carboxylic acid residues (wt %)=[Abs(1699 $cm^{-1}$)/Abs(2237 $cm^{-1}$)]/0.2661

In the above formula, "0.2661" is a coefficient determined by creating a calibration curve from the data of a plurality of samples containing known amounts of unsaturated carboxylic acid residues and acrylonitrile residues.

<Mooney Viscosity>

Two hundred ml of a saturated aqueous solution of a mixture of calcium nitrate and calcium carbonate in a weight ratio of 4:1 was stirred at room temperature, and the XNBR emulsion was added dropwise using a pipette to precipitate a solid rubber. The obtained solid rubber was extracted, subjected to 10 repetitions of washing under stirring with about 1,000 ml ion-exchanged water, subsequently squeezed and dewatered, and then dried under vacuum (60° C., 72 hours) to prepare a rubber measurement sample. The obtained rubber measurement sample was passed several times between 6-inch rollers with a roller separation of about 0.5 mm at a roller temperature of 50° C. until the desired form was obtained, and this sample was then measured in accordance with JIS K 6300-1:2001 "Rubber, Unvulcanized—Physical Property—Part 1, Determination of Viscosity and Scorch Time with Mooney Viscometer". The Mooney viscosity of XNBR-D exceeded the measurement upper limit at a measurement temperature of 100° C.

<Elemental Sulfur Content>

A 0.1 g sample of the solid matter within each XNBR emulsion was combusted in a combustion furnace at 1,350° C. for 12 minutes, the resulting combustion gas was absorbed into an absorbent (an $H_2O_2$ water mixed solution containing 1 to several drops of added dilute sulfuric acid), and the elemental sulfur content was quantified by performing a neutralization titration using a 0.01 NaOH solution.

<Solid Fraction Content>

One gram of each XNBR emulsion was weighed accurately, and following drying at 105° C. for 24 hours, the amount of residual solid matter was weighed to calculate the solid fraction content.

TABLE 1

| | XNBR-A | XNBR-B | XNBR-C | XNBR-D | XNBR-E |
|---|---|---|---|---|---|
| Acrylonitrile residues (wt %) | 35 | 34 | 25 | 34 | 34 |
| Carboxylic acid residues (wt %) | 5.5 | 5.4 | 5.1 | 5.0 | 5.0 |
| ML(1 + 4) 100° C. | 128 | 180 | 122 | >220 | 90 |
| S (wt %) | 0.45 | 0.47 | 0.45 | 0.45 | 0.45 |
| Solid fraction (%) | 45 | 46 | 45 | 46 | 46 |

2) Preparation of NBR

A pressure-resistant polymerization reactor fitted with a stirrer was charged with an emulsion composed of 120 parts by weight of ion-exchanged water, 35 parts by weight of acrylonitrile, 65 parts by weight of 1,3-butadiene, 3 parts by weight of sodium dodecylbenzene sulfonate, 0.3 parts by weight of potassium persulfate, 0.05 parts by weight of sodium ethylenediaminetetraacetate and 1.0 parts by weight of t-dodecyl mercaptan, and following reaction at 60 to 80° C. for 5 hours, a reaction terminator was added to halt the polymerization, thus obtaining a copolymer latex. Following the removal of unreacted monomers from the obtained copolymer latex, ammonia water (pH: 13.3) was added dropwise to adjust the pH of the copolymer latex to a value of 8 or higher, and the concentration was then adjusted to obtain NBR-a having a solid fraction concentration of 45% and a polystyrene-equivalent weight-average molecular weight of 19,700.

With the exception of altering the amount of t-dodecyl mercaptan to 0.5 parts by weight, the same method as above was used to prepare NBR-b having a weight-average molecular weight of 10,900. Further, with the exception of altering the amount of t-dodecyl mercaptan to 0.8 parts by weight, the same method as above was used to prepare NBR-c having a weight-average molecular weight of 6,600.

The weight-average molecular weight and the solid fraction concentration of each NBR are shown in Table 2.

TABLE 2

| | NBR-a | NBR-b | NBR-c |
|---|---|---|---|
| Mw | 19700 | 10900 | 6600 |
| Solid fraction (%) | 46 | 46 | 46 |

[Preparation of Emulsion Compositions]

The elastomers described above were mixed in the weight ratios (for the resin fractions) shown in Table 3, the additives shown in Table 4 were then added to 100 parts by weight of each of the mixed resin fractions, and the mixtures were stirred with a mixer to prepare a series of emulsion compositions 1 to 8. In Table 3, A to E represent XNBR-A to XNBR-E respectively, and a to c represent NBR-a to NBR-c respectively. For example, Example 1 is prepared by mixing 85 parts by weight of the XNBR-A resin and 15 parts by weight of the NBR-a resin.

TABLE 3

|  | Emulsion Composition 1 | Emulsion Composition 2 | Emulsion Composition 3 | Emulsion Composition 4 | Emulsion Composition 5 | Emulsion Composition 6 | Emulsion Composition 7 | Emulsion Composition 8 |
|---|---|---|---|---|---|---|---|---|
| XNBR/NBR | A/a = 85/15 | B/b = 80/20 | C/a = 92/8 | A/a = 91/9 | A/c = 85/15 | A/a = 65/35 | D/b = 80/20 | E/b = 80/20 |

TABLE 4

|  | parts by weight |
|---|---|
| KOH | 1.35 |
| Zinc oxide | 1.1 |
| Titanium oxide (white) | 0.5 |
| Dispersant | 1.5 |
| Antioxidant | 0.25 |
| Colorant | 0.05 |

In Table 4, the dispersant is sodium alkylbenzene sulfonate, the antioxidant is 2,4,6-tri-tert-butylphenol, and the colorant is Fast Green FCF.

[Production of Gloves]

Using each of the emulsion compositions described above, gloves (Examples 1 and 2, Comparative Examples 1 to 6) were produced by the dipping method described below.

(1) A former used as the glove mold was washed with a cleaning solution and subsequently washed with cold water and dried, and the former was then dipped for 15 seconds in an aqueous solution prepared by dissolving the coagulant calcium nitrate in water in an amount sufficient to obtain a $Ca^{2+}$ ion concentration of 10% by weight.

(2) The former with the adhered coagulant was dried at 60° C. for about one minute.

(3) The former was dipped for 20 seconds in the emulsion composition that had been adjusted to a temperature of 30° C.

(4) The former was removed from the emulsion composition, washed with water, and then dipped in hot water (50° C.) for 140 seconds.

(5) The former, which had been coated with a film of the emulsion composition, was dried at 120° C. for 300 seconds and subsequently held at 60° C. for 80 seconds, and the thus obtained glove was then removed from the former.

[Evaluation of Physical Properties of Gloves]

Various physical properties of the obtained gloves were evaluated using the methods described below. The results are shown in Table 5.

<Hot Methyl Ethyl Ketone Extraction Component of Gloves>

The gloves were immersed in methyl ethyl ketone (MEK), an extraction was performed under reflux for 8 hours, the resulting extract was then collected, concentrated and dried, and the thus obtained residue was weighed using a four-digit balance.

<Toluene Swelling Ratio of Gloves>

The gloves were immersed in toluene at normal temperature, and the weight after 72 hours was divided by the initial weight to determine the swelling ratio (%). A lower toluene swelling ratio indicates a higher crosslinking density in the gloves. When a crosslinked polymer such as the gloves is immersed in a good solvent such as toluene, the good solvent attempts to dissolve and expand the polymer chains, but the elasticity of the crosslinked polymer network suppresses this action and causes a swelling equilibrium to be reached, meaning the crosslinking density of the crosslinked polymer adopts an inverse proportional relationship with the equilibrium swelling ratio in good solvents.

<Flexibility of Gloves>

The flexibility of the gloves was evaluated on the basis of the tensile characteristics. A dumbbell-shaped No. 5 test piece prescribed in JIS K 6251:2010 was cut from the glove, a Tensilon Universal Tensile Testing Machine RTC-1310A manufactured by A&D Company, Limited was used to measure the tensile strength (MPa), the breaking elongation (%), and the 500% elastic modulus (MPa) of the test piece under conditions including a test speed of 500 mm/minute, a chuck distance of 75 mm and a gauge mark distance of 25 mm, and the strength and flexibility of the rubber glove were evaluated on the basis of these measurements. The tensile strength indicates the strength of the rubber glove, with a higher numerical value indicating greater strength. Further, the breaking elongation indicates the flexibility of the rubber glove, with a higher numerical value indicating greater flexibility. Furthermore, the 500% elastic modulus indicates the flexibility of the rubber glove, with a higher numerical value indicating lower flexibility.

<Chemical Resistance of Gloves>

Using the method described below, the chemical resistance of the gloves was investigated based on the amount of certain chemical agents that permeated through the gloves.

The glove was turned inside out, 10 ml of one liquid chemical selected from among 47% hydrofluoric (HF) acid, 50% sulfuric acid, physiological saline solution, methanol, ethanol, acetone and N-methylpyrrolidone (NMP) was placed in the middle finger portion of the glove, the middle finger portion was immersed in 30 ml of pure water, and following standing at room temperature for 2 hours, the weight (g) of the chemical compound that had been eluted into the pure water was quantified by ion chromatography or gas chromatography or the like. In Table 5, "ND" indicates an amount below the detection limit.

TABLE 5

|  | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|
| Hot MEK Extraction Component (wt %) | 15.6 | 19.5 | 7.7 | 8.7 | 14.6 | 33.0 | 19.0 | 19.0 |
| Toluene swelling ratio (wt %) | 305 | 296 | 300 | 280 | 300 | 300 | 330 | 400 |
| Tensile strength (MPa) | 27.7 | 24 | 26.9 | 27 | 18.2 | 20.2 | 22.2 | 12 |
| Breaking elongation (%) | 647 | 632 | 553 | 300 | 600 | 700 | 600 | 600 |
| 500% Elastic modulus (MPa) | 15.6 | 13 | 20.2 | — | 14 | 17.1 | 19.1 | 10 |

TABLE 5-continued

|  | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|
| Amount of chemical permeation (g) | | | | | | | | |
| 47% aqueous solution of HF acid | 0.06 | 0.05 | 0.30 | 0.08 | 0.10 | 0.10 | 0.10 | 0.10 |
| Methanol | 0.22 | 0.25 | 0.50 | 0.25 | 0.30 | 0.30 | 0.30 | 0.35 |
| Ethanol | 0.15 | 0.1 | 0.40 | 0.20 | 0.20 | 0.20 | 0.30 | 0.40 |
| Acetone | 3.1 | 3 | 7.8 | 4 | 5 | 5 | 5 | 6 |
| NMP | 0.10 | 0.13 | 0.30 | 0.20 | 0.20 | 0.20 | 0.18 | 0.20 |
| Total amount of chemical permeation (g) | 3.63 | 3.53 | 9.3 | 4.73 | 5.8 | 5.8 | 5.88 | 7.05 |

As illustrated in Table 5, the gloves of the examples each exhibited large values for the tensile strength and breaking elongation, while having a small value for the 500% elastic modulus, indicating superior flexibility. Further, the gloves of the examples exhibited only a small amount of permeation of each of the compounds, indicating that only a small amount of each compound permeated from the outer surface of the glove through to the inner surface, and the fact that the total amount of chemical permeation was also low indicated excellent chemical resistance. In contrast, the glove obtained from the composition containing XNBR-C with a low amount of acrylonitrile residues (Comparative Example 1) exhibited larger amounts of permeation of the chemicals than the examples, indicating inferior chemical resistance. Further, the glove obtained from the emulsion composition having a small NBR content (Comparative Example 2), the glove obtained from the emulsion composition containing a low-molecular weight NBR (Comparative Example 3), the glove obtained from the emulsion composition having a large NBR content (Comparative Example 4), the glove obtained from the emulsion composition containing XNBR-D with a high Mooney viscosity (Comparative Example 5), and the glove obtained from the emulsion composition containing XNBR-E with a low Mooney viscosity each exhibited an extremely poor result for one of the tensile characteristics among tensile strength, breaking elongation and 500% elastic modulus.

The invention claimed is:

1. An emulsion composition comprising:
   (1) a carboxylated acrylonitrile-butadiene elastomer,
      comprising 30 to 40% by weight of acrylonitrile residues and 3 to 8% by weight of unsaturated carboxylic acid residues,
      having an elemental sulfur content detected by neutralization titration of a combusted product of the elastomer of not more than 1% by weight of the elastomer weight, and
      having a Mooney viscosity ($ML_{(1+4)}$ (100° C.)) of 100 to 220; and
   (2) a poly(acrylonitrile-butadiene) having styrene-equivalent weight-average molecular weight of 7,000 to 500,000,
   wherein a weight ratio of component (1)/component (2) is from 70/30 to 90/10.

2. The emulsion composition according to claim 1, wherein the Mooney viscosity of component (1) is from 100 to 200.

3. The emulsion composition according to claim 1, wherein the weight ratio of component (1)/component (2) is from 70/30 to 85/15.

4. The emulsion composition according to claim 1, further comprising, relative to 100 parts by weight of a combination of component (1) and component (2):
   (3) 0.5 to 4.0 parts by weight of a divalent metal oxide, and
   (4) 0.5 to 2.0 parts by weight of a dispersant.

5. The emulsion composition according to claim 1, wherein a solid fraction of the emulsion composition is from 30 to 60% by weight.

6. A glove obtained from an emulsion composition that comprises:
   (1) a carboxylated acrylonitrile-butadiene elastomer,
      comprising 30 to 40% by weight of acrylonitrile residues and 3 to 8% by weight of unsaturated carboxylic acid residues,
      having an elemental sulfur content detected by neutralization titration of a combusted product of the elastomer of not more than 1% by weight of the elastomer weight, and
      having a Mooney viscosity ($ML_{(1+4)}$ (100° C.)) of 100 to 220; and
   (2) a poly(acrylonitrile-butadiene) having styrene-equivalent weight-average molecular weight of 7,000 to 500,000,
   wherein a weight ratio of component (1)/component (2) is from 70/30 to 90/10.

7. The glove according to claim 6, wherein a methyl ethyl ketone extraction fraction obtained under reflux conditions is from 15 to 30% by weight of the glove.

8. The glove according to claim 6,
   wherein the glove exhibits an amount of hydrofluoric acid permeation in a range of 0.1 g or less; an amount of each of methanol permeation and ethanol permeation in a range of 0.3 g or less; an amount of acetone permeation in a range of 5.0 g or less; and an amount of N-methylpyrrolidone permeation in a range of 0.15 g or less, when measured by a method in which the glove is turned inside out; 10 ml of one liquid chemical selected from the group consisting of 47% hydrofluoric acid, methanol, ethanol, acetone, and N-methylpyrrolidone, respectively, is placed in a middle finger portion of the glove; the middle finger portion is immersed in 30 ml of pure water; and following being left standing at room temperature for 2 hours, the amount of each of the hydrofluoric acid, the methanol, the ethanol, and the N-methylpyrrolidone eluted into the pure water is quantified by ion chromatography or gas chromatography.

9. A method for manufacturing a glove, comprising:
   preparing an emulsion composition;
   dipping a dipping mold with an adhered coagulant in the emulsion composition; and
   drying the dipping mold so as to form a glove, wherein the emulsion composition comprises:
- (1) a carboxylated acrylonitrile-butadiene elastomer, comprising
  - 30 to 40% by weight of acrylonitrile residues, and
  - 3 to 8% by weight of unsaturated carboxylic acid residues,
  - having an elemental sulfur content detected by neutralization titration of a combusted product of the elastomer of no more than 1% by weight of the elastomer weight, and
  - having a Mooney viscosity ($ML_{(1+4)}$ (100° C.)) from 100 to 220; and
- (2) a poly(acrylonitrile-butadiene) having a styrene-equivalent weight-average molecular weight from 7,000 to 500,000, and wherein a weight ratio of component (1)/component (2) in the emulsion composition is from 70/30 to 90/10.

\* \* \* \* \*